US010533476B2

(12) United States Patent
Sako

(10) Patent No.: US 10,533,476 B2
(45) Date of Patent: Jan. 14, 2020

(54) RETAINING MATERIAL FOR POLLUTION CONTROL ELEMENT, METHOD FOR MANUFACTURING THE SAME, AND POLLUTION CONTROL DEVICE

(71) Applicant: 3M INNOVATIVE PROPERTIES COMPANY, St. Paul, MN (US)

(72) Inventor: Kenji Sako, Tokyo (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 72 days.

(21) Appl. No.: 15/311,687

(22) PCT Filed: May 21, 2015

(86) PCT No.: PCT/US2015/031879
§ 371 (c)(1),
(2) Date: Nov. 16, 2016

(87) PCT Pub. No.: WO2015/179589
PCT Pub. Date: Nov. 26, 2015

(65) Prior Publication Data
US 2017/0096925 A1  Apr. 6, 2017

(30) Foreign Application Priority Data
May 23, 2014  (JP) .................................. 2014-107431

(51) Int. Cl.
*F01N 3/28* (2006.01)
*F01N 3/021* (2006.01)
(Continued)

(52) U.S. Cl.
CPC ............. *F01N 3/285* (2013.01); *B01D 39/14* (2013.01); *B01D 46/0005* (2013.01);
(Continued)

(58) Field of Classification Search
None
See application file for complete search history.

(56) References Cited

U.S. PATENT DOCUMENTS 7,854,905 B2    12/2010  Yasuda et al.
7,858,051 B2 *  12/2010  Sako ..................... F01N 3/0211
                                                    422/179
(Continued)

FOREIGN PATENT DOCUMENTS

WO    WO 2005/021945    3/2005
WO    WO 2006/020058    2/2006
(Continued)

OTHER PUBLICATIONS

International Search Report for PCT International Application No. PCT/US2015/031879, dated Jul. 20, 2015, 4 pgs.

*Primary Examiner* — Amber R Orlando
(74) *Attorney, Agent, or Firm* — Harold C. Knecht, III

(57) ABSTRACT

A retaining material that can sufficiently maintain the function of retaining a pollution control element in a pollution control device at high temperature. In one aspect, the retaining material has a mat shape and contains inorganic fiber material, with the retaining material containing: a surface layer containing inorganic colloid particles; and an internal region positioned further to the inside than the surface layer, impregnated with inorganic colloid particles and organic binder; wherein the surface layer contains inorganic colloid particles at a higher concentration than the internal region; and the amount of inorganic colloid particles in the internal region is 1 mass % to 10 mass % based on the total mass of the retaining material.

14 Claims, 7 Drawing Sheets

(51) Int. Cl.
*B01D 39/14* (2006.01)
*B01D 46/00* (2006.01)
*B01D 46/10* (2006.01)
*B01D 53/94* (2006.01)
*B01D 35/02* (2006.01)
*B01D 35/06* (2006.01)
*B01J 35/10* (2006.01)
*B01J 35/06* (2006.01)
*F01N 3/022* (2006.01)
*B01J 35/02* (2006.01)

(52) U.S. Cl.
CPC ............ *B01D 46/10* (2013.01); *B01D 53/94* (2013.01); *B01J 35/023* (2013.01); *B01J 35/06* (2013.01); *B01J 35/1009* (2013.01); *B01J 35/1014* (2013.01); *F01N 3/022* (2013.01); *F01N 3/0211* (2013.01); *F01N 3/2842* (2013.01); *F01N 3/2864* (2013.01); *F01N 3/2871* (2013.01); *B01D 2239/0208* (2013.01); *B01D 2239/0407* (2013.01); *B01D 2239/0492* (2013.01); *B01D 2239/10* (2013.01); *B01D 2279/30* (2013.01); *Y02T 10/20* (2013.01)

(56) References Cited

U.S. PATENT DOCUMENTS

| | | | |
|---|---|---|---|
| 8,945,269 B2 | 2/2015 | Kumano | |
| 2009/0025377 A1* | 1/2009 | Yasuda | B01D 46/0005 60/299 |
| 2011/0311404 A1* | 12/2011 | Creedon | C23C 18/1216 422/177 |
| 2013/0305697 A1 | 11/2013 | Sako | |
| 2017/0198622 A1* | 7/2017 | Creedon | C23C 18/1216 |

FOREIGN PATENT DOCUMENTS

| | | | |
|---|---|---|---|
| WO | WO 2007/030410 | 3/2007 | |
| WO | WO 2008/154078 | 12/2008 | |
| WO | WO-2012106295 A1 * | 8/2012 | ............ C04B 35/80 |

* cited by examiner

Amount of inorganic colloid particles

RETAINING MATERIAL FOR POLLUTION CONTROL ELEMENT, METHOD FOR MANUFACTURING THE SAME, AND POLLUTION CONTROL DEVICE

CROSS REFERENCE TO RELATED APPLICATIONS

This application is a national stage filing under 35 U.S.C. 371 of PCT/US2015/031879, filed May 21, 2015, which claims the benefit of Japanese Application No. 2014-107431, filed May 23, 2014, the disclosures of which are incorporated by reference in their entireties herein.

TECHNICAL FIELD

The present invention relates to a retaining material for a pollution control element, a method for manufacturing the same, and a pollution control device.

BACKGROUND TECHNOLOGY

Carbon monoxide (CO), hydrocarbons (HC), and nitrogen oxides (NOx) and the like are included in exhaust gas from an automobile engine. Furthermore, particulate matter such as tin and the like are included in the exhaust gas discharged from diesel engines, and exhaust gas cleaning systems that use a ceramic catalytic converter or a diesel particulate filter (DPF) are known as methods for removing these particles. For example, a ceramic catalytic converter basically includes a metal casing and a honeycomb shaped ceramic catalyst carrier, for example, housed therein.

A standard form of a ceramic catalytic converter includes a catalyst carrier, casing for housing the carrier, and insulation material that is packed in gaps between the outer circumferential surface of the catalyst carrier and the inner surface of the casing. The insulation material holds the catalyst carrier, and prevents mechanical shock due to impact, vibration, or the like from being inadvertently applied to the catalyst carrier. Thereby, damage and movement of the catalyst carrier can be sufficiently suppressed, and therefore the desired effect can be achieved for a long period of time. This type of insulation material has a function of holding a pollution control element such as the catalyst carrier or the like, and therefore is generally also referred to as a retaining material.

Japanese Unexamined Patent Application 2012-157809 discloses a retaining material containing a mat made from inorganic fiber material and an aggregate containing an organic binder and inorganic particles, the aggregate thereof being impregnated into essentially the entire mat. Japanese PCT Patent Application 2009-508044 discloses a retaining material containing an inorganic fiber material mat and at least one friction layer that includes inorganic colloid particles. Japanese Unexamined Patent Application 2013-127244 discloses a retaining sealing material where an inorganic binder and an organic binder are attached to a mat with a predetermined thickness.

SUMMARY OF THE INVENTION

The process of cleaning exhaust gas from an automobile engine is performed at a high temperature, where the inside of the chamber can equal or exceed 900° C. The present invention provides a retaining material that can sufficiently maintain the function of retaining the pollution control element in a pollution control device at such high temperatures.

One aspect of the present invention relates to a retaining material. The retaining material is a mat-shaped retaining material having an inorganic fiber material, containing: a surface layer having inorganic colloid particles; and an internal region positioned further to the inside than the surface layer and impregnated with inorganic colloid particles and an organic binder; wherein the surface layer contains inorganic colloid particles at a higher concentration than the internal region; and the amount of inorganic colloid particles in the internal region is 1 mass % to 10 mass % based on the total mass of the internal region.

Another aspect of the present invention relates to a pollution control device. The device provides a casing; a pollution control element provided in the casing; and a retaining material provided between the casing and the pollution control element.

Yet another aspect of the present invention relates to a method of manufacturing the retaining material. This manufacturing method is a manufacturing method for a retaining material, including: a step of impregnating a first liquid containing inorganic colloid particles and an organic binder into a sheet made from an inorganic fiber material; a step of drying the sheet impregnated with the first liquid; and a step of forming a surface layer by coating a surface of the sheet with a second liquid containing at least inorganic colloid particles.

The present invention provides a retaining material that can sufficiently maintain the function of retaining the pollution control element in a pollution control device at high temperature.

DESCRIPTION OF THE PREFERRED EMBODIMENTS

Figure 1:
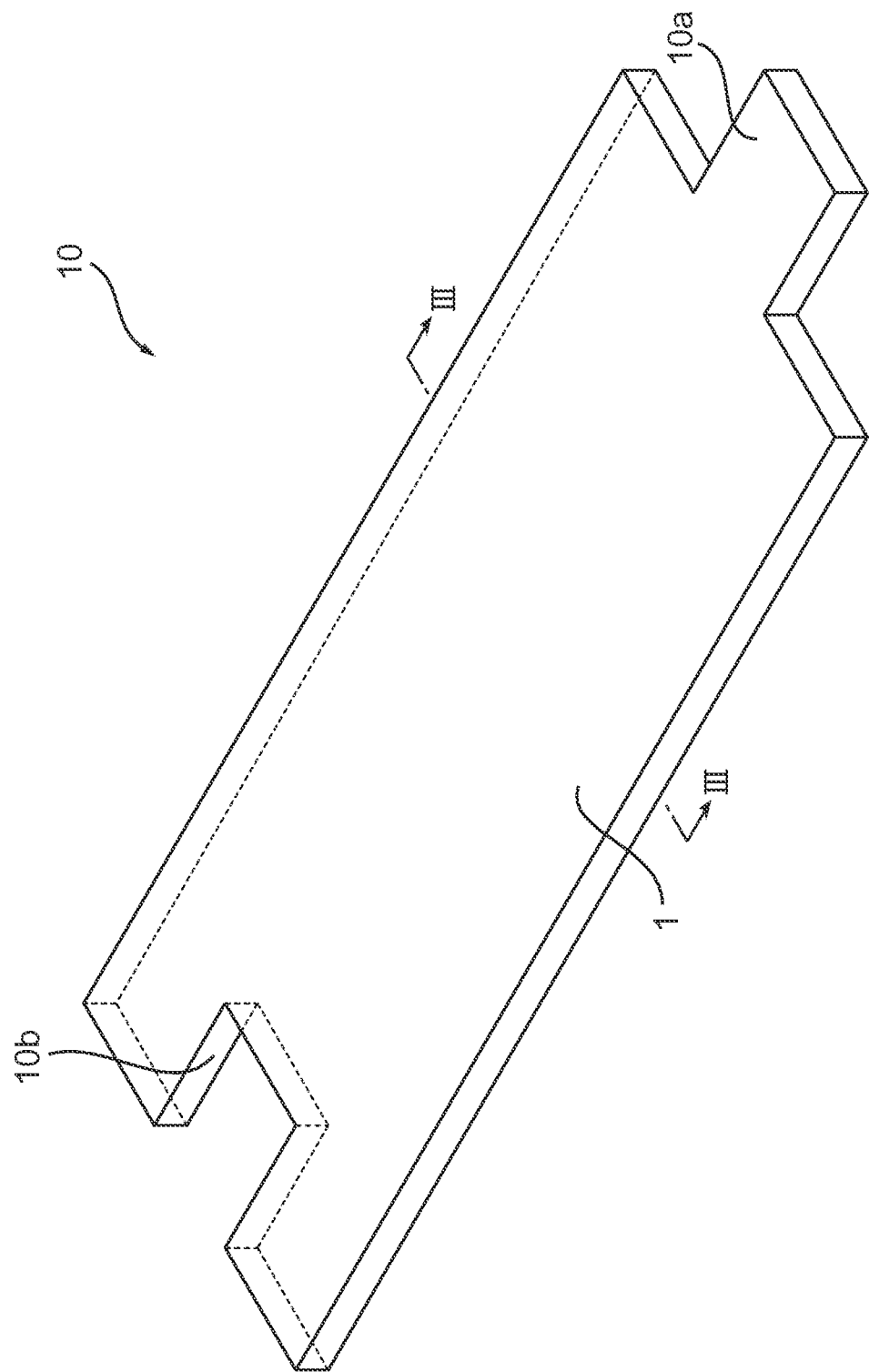
FIG. 1 is a perspective view illustrating the retaining material according to an embodiment of the present invention.

Ahe mat shaped retaining material containing inorganic fiber material according to one embodiment of the present invention includes a surface layer with inorganic colloid particles and an internal region positioned further to the inside than the surface layer, impregnated with inorganic colloid particles and an organic binder, and is primarily characterized in that a fixed amount of inorganic colloid particles are impregnated in the internal region, and the inorganic colloid particles are present in a higher concentration in the surface layer than in the internal region. With the retaining material of the present embodiment, the inorganic colloid particles in the surface layer and the internal region will remain even after the organic binder is consumed at a high temperature, and thus a high surface pressure and static coefficient of friction can be maintained, and as result, a high retaining force is achieved.

Furthermore, the retaining material of the present embodiment can be formed by a process that includes a step of impregnating a first liquid containing inorganic colloid particles and an organic binder into a sheet made from an inorganic fiber material; a step of drying the sheet impregnated with the first liquid; and a step of forming a surface layer by coating a surface of the sheet with a second liquid containing at least inorganic colloid particles. By providing a step of coating the surface of the sheet with a second liquid that has inorganic colloid particles separate from the impregnating step, a fixed amount of inorganic colloid particles and organic binder will be present in the internal region, and a surface layer primarily containing inorganic colloid particles will be formed, and a retaining material can be achieved where the inorganic colloid particles exist at a higher concentration in the surface layer as compared to the internal region.

In the specification of this application, the retaining force of the pollution preventing element is determined by the following formula when the pollution control element (for example a catalyst carrier) is retained in a pollution control device (for example a catalytic converter) by the retaining material.

Retaining force=(surface pressure)×(static coefficient of friction)

Therefore, the retaining force of the pollution control element can be increased by increasing the surface pressure of the retaining material by increasing the amount of compression on the retaining material, or by increasing the static coefficient of friction of the retaining material. With the retaining material of the present embodiment, a surface layer that includes a high concentration of inorganic colloid particles is formed on the surface of the retaining material. As a result, the surface of the retaining material can be imparted with a surface shape that demonstrates a higher coefficient of friction than the surface of the ceramic fibers and other inorganic fibers that form the retaining material, because of the presence of this surface layer. Furthermore, the coefficient of friction between the surface of the retaining material and the surface of the pollution control element or the surface of the casing can be increased because of the presence of this surface shape. The coefficient of friction between the retaining material of the present embodiment and the casing is particularly increased if the casing is made of a metal plate, such as stainless steel (SS) for example.

Preferred embodiments of the present invention are described below in detail, while referring to the drawings.

FIG. 1 is a perspective view illustrating an example of the retaining material of the present embodiment. A retaining material 10 illustrated in this figure is wrapped around a pollution control element 30 having a round cylindrical or elliptical cylindrical outer shape, in order to retain the element in the casing 20 (refer to FIG. 5). The retaining material 10 has a length that is in accordance with the length of the outer circumference of the pollution control element 30. The retaining material 10 has a convex part 10a on one end, and a concave part 10b on another end, for example, and has a shape such that the convex part 10a and the concave part 10b mutually engage when the retaining material 10 is wrapped around the pollution control element 30, but the shape for the mating is not restricted in particular, and any shape that can effectively prevent leaking of the exhaust gas in the mating region is acceptable, and other shapes such as an L shape are also possible.

Figure 2A:
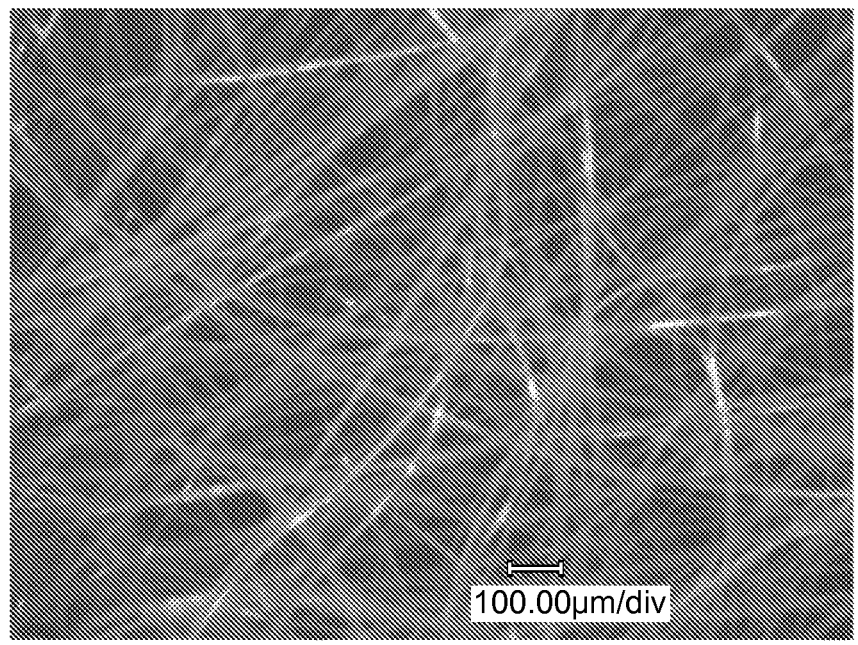
FIG. 2 is an optical microscope photograph of a sheet that forms the inorganic fiber material, where (a) and (b) are photographs taken before and after impregnating with the inorganic colloid particles and the organic binder.
Figure 2B:
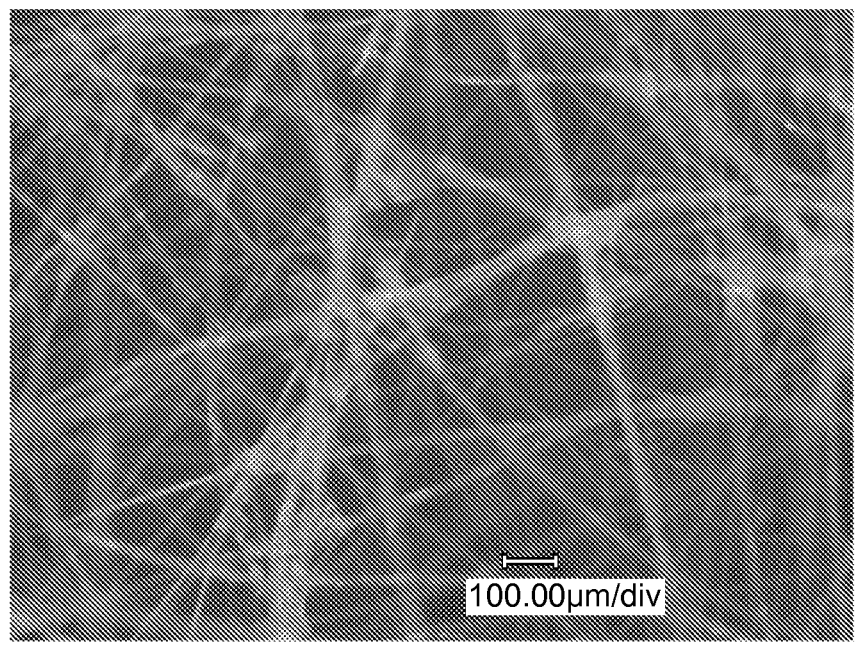

FIG. 2 is an enlarged photograph of the sheet 1 using an optical microscope. FIG. 2(a) is a photograph of a sheet made of aluminum fibers to which the organic binder and the inorganic colloid particles are not attached. When the organic binder and the inorganic colloid particles are attached to this sheet, the organic binder and the inorganic colloid particles will adhere to the surface of the inorganic fibers and at the intersections, and thus an effect of bonding the fibers together while imparting the surface of the alumina fibers with a concave and convex shape can be achieved, as illustrated in FIG. 2(b).

Figure 3A:
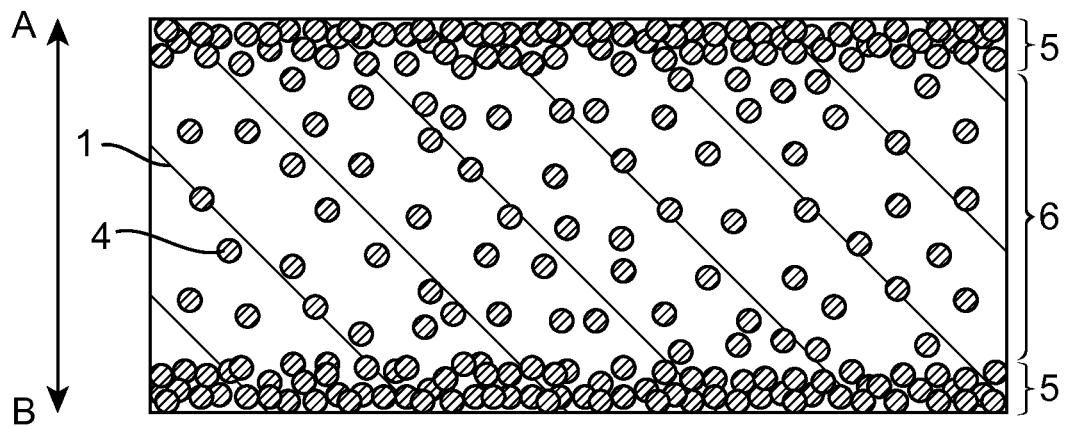
FIG. 3 (a) is a schematic cross-sectional view along line III-III of FIG. 1, and (b) is a graph schematically showing the distribution of inorganic colloid particles at A-B in the thickness direction of FIG. 3(a).
Figure 3B:
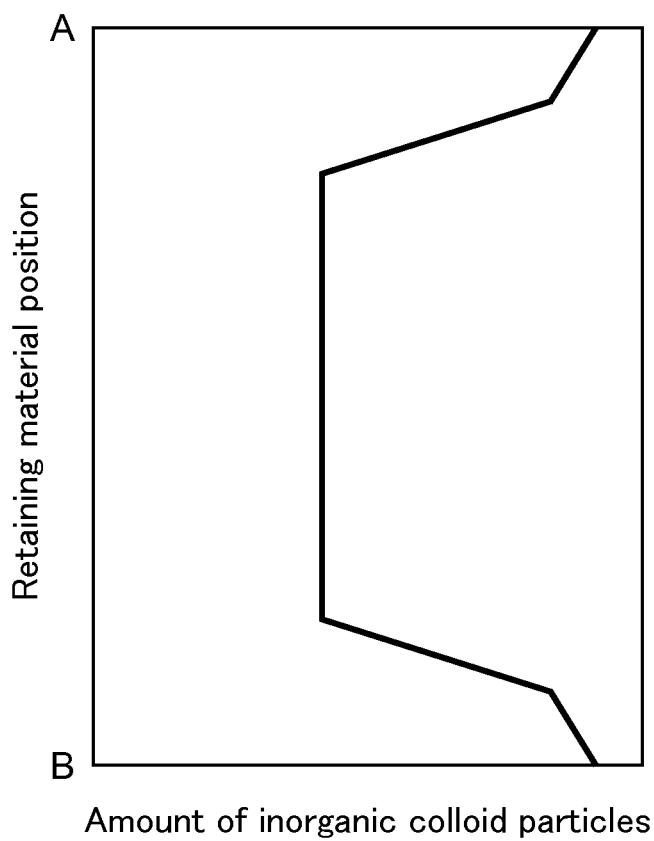

As illustrated in FIG. 3(a), the retaining material 10 has a surface layer 5 primarily containing inorganic colloid particles, and an internal region 6 positioned further to the inside than the surface layer 5. The inorganic colloid particles 4 and the organic binder 3 are impregnated into the internal region 6. The concentration distribution of the inorganic colloid particles in the thickness direction of the retaining material 10 is shown in FIG. 3(b). As shown in this figure, the inorganic colloid particles are impregnated in the internal region at a predetermined concentration, and the concentration of inorganic colloid particles 4 in the surface layer 5 is higher than the concentration in the internal region 6. The retaining material 10 has a surface layer 5 on both surfaces. Note that it is acceptable for the retaining material 10 to have the surface layer 5 on only one surface. Also note that in the specification of the present application, the "concentration" of the inorganic colloid particles can indicate the amount of inorganic colloid particles in a fixed region, such as the amount of inorganic colloid particles per unit area or per unit volume.

The amount of inorganic colloid particles 4 per unit area that are included in one surface layer 5 can be 1 $g/m^2$ to 20 $g/m^2$. If the amount of inorganic colloid particles 4 included in the surface layer 5 is 1 $g/m^2$ or higher, the static coefficient of friction required to retain the pollution control element in the casing can easily be achieved, but on the other hand, if the amount is 20 $g/m^2$ or less, the surface layer 5 can be prevented from becoming excessively hard, and cracking of the surface layer 5 and detachment of the inorganic colloid particles 4 can be suppressed. The amount of inorganic colloid particles 4 in the surface layer 5 is preferably 2 $g/m^2$ to 18 $g/m^2$, and more preferably 3 $g/m^2$ to 15 $g/m^2$. Note that the amount based on the total mass of the retaining material of the surface layer 5 is, for example, approximately 0.05 to 3 mass %, and when considering the thickness of the surface layer, the inorganic colloid particles can be said to be distributed in the surface layer at a higher concentration than the internal region.

The surface layer 5 is formed so as to cover the surface of the sheet 1, or in a form where at least a portion thereof on the sheet 1 side is embedded in the sheet 1. The surface layer 5 contains inorganic colloid particles 4 as a main component from those components that are attached to the sheet 1. Note that with regards to whether or not the inorganic colloid particles are present at a high concentration, the inorganic colloid particles will obviously be included at a high concentration as a main component in the surface layer 5 if a solution containing inorganic colloid particles as a main component is coated onto the surface of the sheet under the manufacturing conditions. Furthermore, in the final product, the attached condition of the inorganic colloid particles can be confirmed by comparing the surface layer and the internal region by using various types of surface analysis techniques or by observing the surface using an optical microscope, SEM, or the like. Note that the organic binder 3 can also be included in addition to the inorganic colloid particles. Herein, a main component refers to a composition that is a main component of the surface layer 5, excluding inorganic fibers. The main component is not restricted to a single type, and a plurality of main components can also be present. For example, the inorganic colloid particles can be included as a main component at a level of 0.01 mass % or higher in the surface layer, based on mass. Note that the thickness of the surface layer 5, which is the region where the inorganic colloid particles 4 are present at a high concentration, is not particularly restricted. The thickness of the surface layer 5 can be, for example, 0.1 to 2 mm, or can be 0.1 to 1 mm (refer to FIG. 3).

In the retaining material 10, the inorganic colloid particles will be present at a high concentration on the surface of the retaining material 10 if a surface layer 5 primarily containing inorganic colloid particles 4 is provided. The retaining material 10 will demonstrate an effect of maintaining a sufficiently high static coefficient of friction because sintering of the inorganic colloid particles 4 will proceed when exposed to high temperature conditions.

FIG. 3(a) shows only the distribution of the inorganic colloid particles 4, but the distribution of the organic binder 3 is not particularly restricted. The organic binder can be distributed only in the internal region, or can be included at higher levels in the surface layer 5 than in the internal region 6, similar to the inorganic colloid particles 4.

Note that reducing the amount of organic binder included in the retaining material is particularly useful for the control systems of highly advanced automobile engines. If excess organic binder is included in the retaining material, there is a possibility that the sensors of the control system will malfunction in conjunction with burning thereof. In particular, if an acrylic latex with a glass transition temperature of −5° C. or lower is used as the organic binder, the organic binder will have sufficiently high wettability with regards to the inorganic fibers at room temperature where the assembly process is performed, and therefore scattering of the inorganic fibers can be effectively suppressed. Scattering of fiber pieces can be sufficiently suppressed even if the content of the organic binder based on the total mass of the retaining material is, for example, 3 mass % or less.

The amount of organic binder in the retaining material 10 is preferably 3 mass % or less, and more preferably 2 mass % or less based on the total mass of the retaining material 10. As described above, the risk of malfunction and the like of the sensors of an automobile control system due to burning of the organic binder can be eliminated by controlling the content of the organic binder. The lower limit of the organic binder content is preferably 0.1 mass % from the perspective of preventing scattering of fiber pieces.

The organic binder 3 and the inorganic colloid particles 4 are both dispersed in the internal region 6 of the retaining material 10. The inorganic colloid particles that have adhered to the surface of the inorganic fibers remain in the mat shaped retaining material even after the organic binder has burned off, and thus an effect of maintaining a sufficiently high surface pressure between the inner surface of the casing and the pollution control element can be demonstrated.

The amount of inorganic colloid particles 4 in the internal region 6 can be 1 mass % to 10 mass % based on the total mass of the retaining material. If the amount of inorganic colloid particles 4 in the internal region 6 is 1 mass % or higher, sufficiently high surface pressure can easily be achieved. Note that if the amount of inorganic colloid particles 4 in the internal region 6 exceeds 10 mass %, the flexibility of the retaining material 10 will be insufficient, and the work of wrapping the retaining material 10 around the pollution control element will be difficult. The amount of inorganic colloid particles 4 in the internal region 6 is preferably 2 mass % to 8 mass %, and more preferably 2 mass % to 5 mass % based on the total mass of the retaining material.

The amount of organic binder 3 in the surface layer 5 is not restricted, but can be, for example, 0.2 g/m$^2$ to 25 g/m$^2$, but 0.4 g/m$^2$ to 10 g/m$^2$ is more preferable. If the amount of organic binder 3 in the surface layer 5 is 0.2 g/cm$^2$ or higher, scattering of the inorganic fibers can be sufficiently suppressed, and the amount of organic binder that is used can be sufficiently reduced if the amount is 25 g/cm$^2$ or less.

The amount of organic binder in the surface layer 5 and the internal region 6 can be measured by using the heating weight loss of the retaining material as the amount of organic binder, using the method described below with regards to each region.

The inorganic colloidal particles 4 and the organic binder 3 are preferably used by essentially uniformly dispersing in the internal region 6 of the retaining material 10. In other words, when the thickness of the retaining material 10 is observed, the inorganic colloid particles 4 and the organic binder 3 are preferably essentially uniformly dispersed in the thickness direction of the internal region 6 of the retaining material 10.

Next, the sheet 1, the organic binder 3, and the inorganic colloid particles 4 that form the retaining material 10 will be described.

The sheet 1 includes fibrous material, preferably inorganic fibers. The inorganic fibers that are preferable for forming the sheet 1 can be glass fibers, ceramic fibers, carbon fibers, silicon carbide fibers, and boron fibers, but if necessary, other inorganic fibers can also be used. The inorganic fibers can be a single type used individually, or can be two or more types used in combination, and composite fibers are also acceptable. Ceramic fibers such as alumina fibers, silica fibers, and alumina-silica fibers are particularly preferable for the inorganic fibers. The ceramic fibers can be a single type used individually, or can be two or more types used in combination, and composite fibers are also acceptable. Furthermore, other inorganic fibers can be used as an additive with either the ceramic fibers or the other inorganic fibers. Examples of preferable additives include zirconia, magnesia, calcia, chromium oxide, yttrium oxide, and lanthanum oxide. The additives are normally used in the form of a powder or fine particles, and a single type can be used individually, or two or more types can be used as a mixture.

The thickness (average diameter) of the inorganic fibers that form the sheet 1 is not particularly restricted, but fibers with an average diameter of approximately 2 to 7 μm are suitable. If the inorganic fibers have an average diameter that is smaller than approximately 2 μm, there will be a tendency for brittleness and insufficient strength, but conversely, fibers with an average diameter that is larger than approximately 7 μm will tend to have difficulty forming the retaining material.

Furthermore, similar to the thickness, the length of the inorganic fibers is also not particularly restricted. However, the inorganic fibers preferably have an average length of approximately 0.5 to 50 mm. If the average length of the inorganic fibers is less than approximately 0.5 mm, the effect and the like of forming the retaining material using these fibers will be difficult to achieve, but conversely, if the length is larger than approximately 50 mm, the handling properties will likely be inferior, and therefore the manufacturing process for the retaining material will not easily proceed smoothly.

The sheet 1 can be an alumina fiber sheet primarily made from a laminate sheet of alumina fibers. The average length of the alumina fibers in this alumina fiber sheet is preferably within a range of approximately 20 to 200 mm, and the thickness (average diameter) of the fibers is preferably within a range of approximately 1 to 40 μm. Furthermore, the alumina fibers preferably have a mullite composition where the weight ratio of $Al_2O_3/SiO_2$ is such that $(Al_2O_3/SiO_2)$=approximately 70/30 to 74/26.

The aforementioned alumina fiber sheet can be manufactured by using a thread spinning base solution containing a mixture of an alumina source such as aluminum oxychloride or the like, a silica source such as silica sol or the like, an organic binder such as polyvinyl alcohol or the like, and water. In other words, the spun alumina fiber precursor is laminated to form a sheet, and then this sheet is normally baked at a high temperature of approximately 1000 to 1300° C. in order to produce the aforementioned sheet.

This sheet is preferably a molded article that is subsequently needle punched. With this type of sheet, the shape retaining properties of the individual sheet can be ensured by the entangling of the inorganic fiber material that forms the sheet.

The organic binder adheres to the inorganic fibers, and suppresses scattering of fiber pieces. Suitable examples of the organic binder include natural or synthetic polymer materials, such as butadiene-styrene resin, polystyrene resin, polyvinyl acetate resin, acrylic resin, and other resin materials, as well as organic material such as polyvinyl alcohols and the like. An acrylic latex can be preferably used as the organic binder.

There are many different types of acrylic latexes, but one with a suitable glass transition temperature (Tg) is preferably selected in consideration of the properties required for the configuration of the retaining material 10 and the properties required for the pollution control element 30. Acrylic latexes are known to normally have a Tg within a range of −70 to 50° C., but with the present embodiment, an acrylic latex with a Tg of 15° C. or lower is preferable, but latex with a Tg of 1° C. or lower or −10° C. or lower can also be used. If an acrylic latex with a Tg of 15° C. or lower is used, sufficiently high wettability can be demonstrated toward the inorganic fibers in the mat at the ordinary operating temperature (25° C.) at which the operation of assembling the pollution control element 30 in the casing 20 is performed, and therefore scattering of the fiber pieces can be effectively suppressed.

The organic binder that is used in this embodiment can be any acrylic latex so long as it does not have a pejorative effect on the properties of the retaining material 10, and various types of acrylic latexes can be used, and if desired, a commercially obtainable acrylic latex can be used as is, or can be used after arbitrarily modifying it to match the environment where the retaining material will be used. An appropriate acrylic latex is a colloid dispersion obtained by dispersing an acrylic resin in an aqueous medium or other medium.

Figure 4:
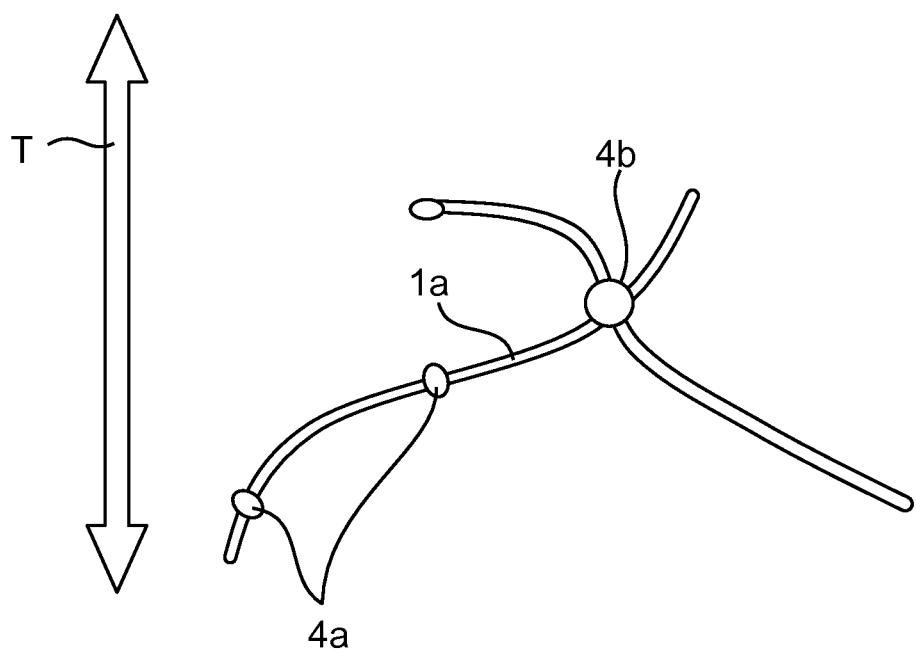
FIG. 4 is a schematic diagram illustrating a condition where sintered inorganic colloid particles are attached to the inorganic fiber after the retaining material of an embodiment of the present invention has been exposed to high temperature conditions.

The inorganic colloid particles 4 will be present in a dispersed condition in the internal region 6 if impregnated into the sheet 1 along with the organic binder 3. More specifically, prior to applying heat to the retaining material 10, the inorganic colloid particles 4 will adhere and exist on the surface of the inorganic fibers and at the fiber intersecting points along with the organic binder. Subsequently, if the retaining material 10 is exposed to high temperature conditions such that the organic binder 3 will combust, sintering of the inorganic colloid particles 4 will proceed, and the inorganic colloid particles 4 that have adhered to the surface of the inorganic fibers will be firmly bonded to the inorganic fibers and form a sintered body 4a, and thus it is thought that the surface roughness of the inorganic fibers will be increased, and the inorganic colloidal particles will play a role in inhibiting mutual sliding of the inorganic fibers (refer to FIG. 4). On the other hand, the inorganic colloid particles 4 that have adhered to the intersecting points of the inorganic fibers will form a sintered body 4b, will bind the intersecting points, and are thought to play a role in maintaining the three-dimensional shape of the inorganic fibers. The retaining material 10 will not easily be compressed in the thickness direction (direction of arrow T in FIG. 4) due to the function of the inorganic colloid particles 4, and thus it is thought that sufficiently high surface pressure can be maintained (refer to FIG. 4). Furthermore, the inorganic colloid particles 4 in the surface layer 5 of the retaining material 10 will contribute to increasing the surface roughness of the retaining material 10, and thereby it is thought that a high static coefficient of friction can be maintained. Note that FIG. 4 is a conceptual schematic diagram to aid in understanding a structural example of the inorganic colloid particles 4 and the inorganic fibers 1a in the sheet after combustion of the organic binder.

The inorganic colloid particles 4 can be any type that can be firmly bonded to the inorganic fibers 1a, and preferable specific examples include colloid particles formed from fine particles made of metal oxides, nitrides, carbides, and compound materials thereof. These fine particles can be a single type used individually, or can be two or more types used in combination. If the sheet 1 is a sheet that contains alumina fibers, the inorganic colloid particles 4 are preferably formed from fine particles selected from silica fine particles, alumina fine particles, titania fine particles, and zirconia fine particles, from the perspective of the bonding property with the alumina fibers.

Note that with the present embodiment, the size and shape of the inorganic colloid particles are not restricted, so long as the particles will adhere to the inorganic fibers, and will remain in the sheet after the organic binder has combusted when the retaining material is used in a pollution control device, but the average particle diameter of the inorganic colloid particles 4 is preferably 1 μm or less, and more preferably 500 nm or less, from the perspective of the sintering properties. On the other hand, the lower limit value of the average particle diameter of the inorganic colloid particles 4 is preferably 1 nm, and more preferably 4 nm, from the perspective of handling properties and ease of procurement. Note that the average particle diameter can be measured using a BET method as a representative example.

The retaining material 10 of the present embodiment has a surface layer primarily containing the inorganic colloid particles 4, and therefore a surface pressure that is 5% to 10% higher than a conventional material can be achieved. For example, if the packing density before baking is set to 0.25 g/cm$^3$, the surface pressure can be 90 kPa or higher, 100 kPa or higher, or 110 kPa or higher. However, if the packing density is set to 0.25 g/cm$^3$, a retaining material that has a surface pressure that exceeds 400 kPa will have a possibility of crushing the catalytic control element at the maximum packing density in the pollution control device. Furthermore, the retaining material 10 of the present embodiment has a surface layer primarily containing the inorganic colloid particles 4, and therefore a higher static coefficient of friction prior to firing can be achieved as compared to a conventional material, and for example, high values within a range of 0.30 or higher or 0.34 or higher to 1.00 or lower can be achieved.

Furthermore, the retaining material 10 can maintain a high surface pressure after firing, and thus the pollution control element can be firmly retained in the casing for a long period of time. The surface pressure of the retaining material after firing can be measured by the following method, for example. The retaining material is compressed by two plates until reaching the mat pressure where the packing density is 0.25 g/cm$^3$, and then one of the plates is heated to 900° C., while the other plate is heated to 650° C. Next, the surface pressure is measured 20 hours after the plates have respectively reached 900° C. and 650° C., and thereby the surface pressure after firing can be achieved. The surface pressure after firing can be a high surface pressure of 60 kPa or higher, 65 kPa or higher, or 70 kPa or higher.

Furthermore, the retaining material 10 can maintain a high static coefficient of friction even after firing (600° C. for 1 hour), and thus the pollution control element can be firmly retained in the casing for a long period of time. For example, the static coefficient of friction of the surface that contacts the case can be 0.30 or higher, 0.32 or higher, or 0.35 or higher. The static coefficient of friction of the retaining material after firing can be maintained at a high value within a range of 1.00 or lower.

Next, the manufacturing method of the retaining material 10 is described. The manufacturing method according to the present embodiment includes (a) a step of impregnating a first liquid containing inorganic colloid particles 4 and an organic binder 3 into a sheet 1 made from an inorganic fiber material; (b) a step of drying the sheet 1 impregnated with the first liquid; (c) and a step of forming a surface layer 5 by coating a surface of the sheet 1 with a second liquid containing at least inorganic colloid particles 4. With the aforementioned manufacturing method, a retaining material 10 can be achieved where both components of the organic binder 3 and the inorganic colloid particles 4 will exist dispersed in essentially the entire sheet 1, and the inorganic colloid particles 4 will be coated onto the surface layer 5. Therefore, with this manufacturing method, and a retaining material 10 exhibiting an excellent surface pressure and excellent static coefficient of friction and that can suppress scattering of fiber pieces can be efficiently produced.

The organic binder 3 and the inorganic colloid particles 4 in the first solution of step (a) can be as described above. Furthermore, a colloid solution where the inorganic colloid particles 4 are dispersed can also be used. Preferable examples of the colloid solution (inorganic sol) where the inorganic colloid particles are dispersed include silica sols, alumina sols, titania sols, zirconia sols, and the like. For example, the silica sol can be commercial Snowtex (registered trademark, product of Nissan Chemical Industries, Ltd.) and the like. The use of a colloid solution is advantageous because a uniform solution containing inorganic colloid particles of sufficient size can easily be produced.

The impregnating method is not particularly restricted, so long as the method can sufficiently adhere inorganic colloid particles 4 and the organic binder 3 to the inorganic fibers of the internal region that forms the sheet 1. For example, the sheet 1 can be immersed in the first solution, or the solution can be coated onto the surface of the sheet 1, and then the solution can be impregnated into the entire sheet by applying suction from the back surface, or the inorganic colloid particles 4 and the organic binder 3 can be impregnated into the internal region of the sheet 1 and can be adhered to the inorganic fibers of the internal region by performing a process of filtering the solution using the sheet 1.

In step (a), the composition of the first liquid is preferably adjusted such that amount of inorganic colloid particles 4 in the internal region 6 of the sheet positioned further to the inside than the surface layer 5 is 1 mass % to 10 mass %, based on the total mass of the internal region. If the amount of inorganic colloid particles 4 in the internal region 6 is less than 1 mass % based on the total mass of the internal region 6, sufficient surface pressure will be difficult to achieve. Furthermore, if the amount of inorganic colloid particles 4 in the internal region 6 exceeds 10 mass % based on the total mass of the internal region 6, the retaining material 10 will be too hard, and therefore the retaining material 10 will not likely have sufficient flexibility to wrap around the pollution control element. The composition of the first liquid or the impregnating conditions are more preferably adjusted such that the amount of inorganic colloid particles 4 in the internal region 6 is 2 mass % to 8 mass %, based on the total mass of the internal region 6.

Step (b) can be a step that can dry the sheet 1 obtained by step (a). For example, the sheet obtained from step (a) can be dried for 10 to 180 minutes in a forced air dryer set at 80 to 250° C.

The second liquid of step (c) can be a solution that contains at least inorganic colloid particles. Note that the same liquid as the first liquid that contains the organic binder 3 and the inorganic colloid particles 4 can also be used.

The coating method is not particularly restricted, and can be a method that can uniformly adhere the second liquid to essentially only the surface region of the sheet 1. Preferable examples of the coating method include spray coating, roller coating, film transfer, curtain coating, and the like.

Furthermore, the coating in step (c) is preferably performed by coating the second liquid onto both surfaces of the sheet 1. With the retaining material 10 obtained in this manner, a surface layer 5 containing a large amount of inorganic colloid particles 4 is provided on both surfaces, and therefore the static coefficient of friction of both surfaces of the retaining material 10 will be increased, and the pollution control element can be more firmly retained in the casing. Furthermore, scattering of fiber pieces can be further suppressed by covering both surfaces of the retaining material 10 with a surface layer 5 containing a high concentration of the inorganic colloid particles 4 and the organic binder 3.

In step (c), the composition of the second liquid and the amount of coating of the second liquid are preferably adjusted such that the amount of inorganic colloid particles 4 of the surface layer 5 formed by coating is within a range of 1 g/m$^2$ to 20 g/m$^2$. If the amount of inorganic colloid particles in the surface layer is less than 1 g/m$^2$, the static coefficient of friction necessary for retaining the pollution control element in the casing will be difficult to achieve. On the other hand, if the amount of inorganic colloid particles in the surface layer is higher than 20 g/m$^2$, the surface layer 5 will be hard, and cracking of the surface layer 5 and shedding of the inorganic colloid particles 4 will easily occur. The amount of inorganic colloid particles 4 in the surface layer 5 is more preferably 2 g/m² to 18 g/m², even more preferably 3 g/m² to 15 g/m², and the composition of the second liquid and the amount of coating of the second liquid can be adjusted in order to achieve this range.

With the manufacturing method of the present embodiment, the composition of the first liquid and the second liquid as well as the amount of coating of the second liquid are preferably adjusted so that the amount of organic binder 3 is 3 mass % or less, based on the total mass of the retaining material 10. The retaining material 10 obtained in this manner can suppress the possibility of malfunction of the control system sensors that accompanies combustion of the organic binder because the amount of organic binder will be low. The amount of organic binder 3 is more preferably 2 mass % or less, even more preferably 1 mass % or less, based on the total mass of the retaining material 10, and the composition of the first and second liquids as well as the amount of coating of the second liquid can be adjusted in order to achieve this range.

After performing steps (a) through (c), the retaining material of the present embodiment is obtained by dewatering and/or drying the sheet. The retaining material obtained can be used by cutting to the desired shape and size if necessary.

Figure 5:
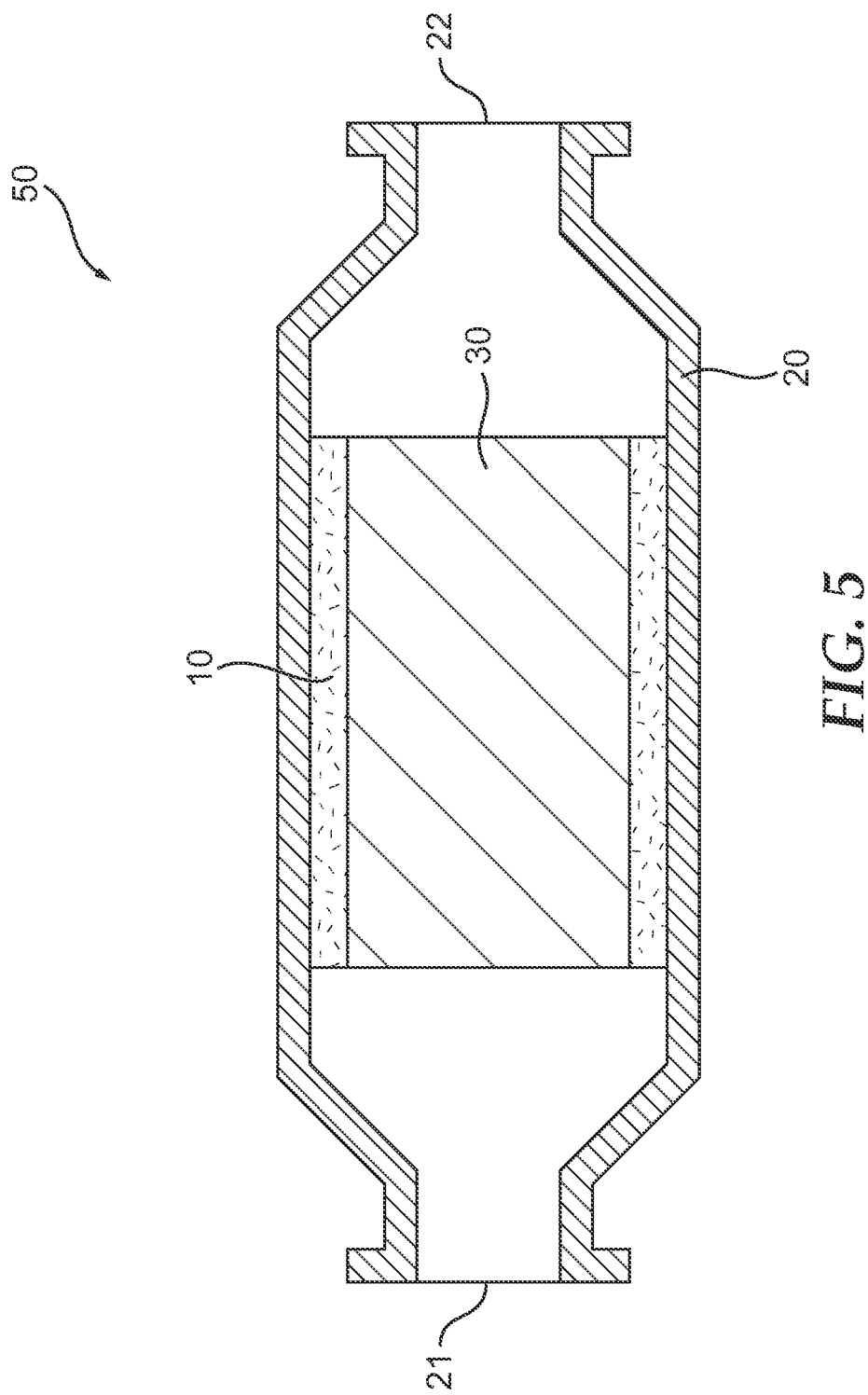
FIG. 5 is a cross-sectional view schematically illustrating the pollution control device according to an embodiment the present invention.

As illustrated in FIG. 5, the retaining material 10 is used to retain the pollution control element 30 in a pollution control device 50. A specific example of the pollution control element 30 is a catalyst carrier or a filter element or the like that is used for cleaning the exhaust gas from an engine. Specific examples of the pollution control device 50 include catalytic converters and exhaust cleaning devices (for example, a diesel particulate filter device).

The pollution control device 50 illustrated in FIG. 5 has a casing 20, a pollution control element 30 provided in the casing 20, and a retaining material 10 provided between the inner surface of the casing 20 and the outer surface of the pollution control element 30. The pollution control device 50 also has a gas intake port 21 where the exhaust gases are introduced to the pollution control element 30, and a gas discharge port 22 where the exhaust gas that has passed through the pollution control element 30 is discharged.

The width of the gap between the inner surface of the casing 20 and the outer surface of the pollution control element 30 is preferably approximately 1.5 to 15 mm, from the perspective of reducing the amount of retaining material 10 that is used and ensuring a hermetic seal. The retaining material 10 is preferably in an appropriately compressed condition to achieve a suitable bulk density between the casing 20 and the pollution control element 30. By using the retaining material 10 to retain the pollution control element 30, scattering of the inorganic fiber material can be sufficiently suppressed during the manufacturing process, and a sufficiently high surface pressure and static coefficient of friction can be maintained between the inner surface of the casing 20 and the pollution control element 30. Furthermore, the bulk density can be set lower during assembly as compared to a conventional configuration, and therefore the usage amount of the relatively expensive inorganic fiber material can be reduced.

The method of compressing and assembling the retaining material 10 can be the clamshell method, stuffing method, tourniquet method, or the like.

The pollution control device 50 can firmly retain the pollution control element 30 in the casing 20 by providing the retaining material 10 which has both high surface pressure and a high static coefficient of friction.

For example, if a catalytic converter is configured as the pollution control device 50, the catalytic converter preferably is a catalytic converter that has a catalyst element with a monolith form, or in other words is a monolith type catalytic converter. This catalytic converter is made with a catalyst element with small channels and a honeycomb cross-section, and therefore the size will be smaller as compared to a conventional pallet type catalytic converter, the contact surface with the catalyst and the exhaust gas will be sufficiently ensured, and therefore the exhaust gas resistance can be kept low, and therefore treatment of the exhaust gas can be more efficiently performed. The catalytic converter can be advantageously used for treating exhaust gas in combination with various types of internal combustion engines. In particular, excellent effects can be demonstrated when a catalytic converter with this configuration is implemented in the exhaust system of an automobile such as a passenger car, bus, truck, and the like.

The catalyst that is to be carried by the catalyst carrier is normally a metal (such as platinum, ruthenium, osmium, rhodium, yttrium, nickel, palladium, and the like) or a metal oxide (such as vanadium pentoxide, titanium dioxide, and the like), and a coating form is preferably used. Note that the pollution control device can be constructed as a diesel particulate filter by using a filter element in place of the catalyst carrier.

EXAMPLES

The present invention is described while referencing examples. Note that the present invention is in no way restricted by these examples.

Example 1

Impregnating Step

A first liquid containing inorganic colloid particles and an organic binder was prepared by adding 24 g of colloidal silica (Snowtex OS, produced by Nissan Chemical Industries, Ltd.) and 0.7 g of Nippol LX874 (Tg: −31° C., produced by Nippon Zeon Co., Ltd.) to 500 mL of water and stirring for 5 minutes. A needle punched alumina fiber blanket (produced by Mitsubishi Plastics, Inc., Muftech MLS-2 blanket (product name)) was cut to 14 cm×49 cm, the first liquid was coated by spraying, and then suctioning and dewatering were performed for 5 seconds on a metal mesh. After the first liquid was impregnated into the blanket in this manner, drying was performed for 30 minutes using a forced air dryer with the temperature set to 170° C.

Surface Coating Step

A second liquid containing inorganic colloid particles and an organic binder was prepared by adding 63 g of colloidal silica (Snowtex OS) and 10 g of Nippol LX874 to 65 mL of water and stirring for 1 minute. The second liquid was applied to both an upper surface and a lower surface of the blanket that had been impregnated with the first liquid and dried by spraying an amount that totaled 7 g/m² per blanket onto both surfaces of the blanket thereof such that the amount of colloidal silica was 3.5 g/m² respectively. The blanket with the second liquid applied was dried for 5 minutes in a forced air dryer with the temperature set to 170° C. to thereby produce the retaining material. The amount of organic binder in the retaining material was 0.7 mass % based on the total mass of the retaining material.

Example 2

A retaining material was prepared similar to example 1, except that the amount of the second liquid that was applied to both surfaces by spraying an amount that totaled 14 g/m² per blanket onto the upper surface and a lower surface of the blanket that had been impregnated with the first liquid and then dried, such that the amount of colloidal silica was 7.0 g/m². The amount of organic binder in the retaining material was 0.8 mass % based on the total mass of the retaining material.

Example 3

A retaining material was prepared similar to working example 1, except that the second liquid was applied to both surfaces by spraying an amount that totaled 28 g/m² per blanket onto the upper surface and a lower surface of the blanket that had been impregnated with the first liquid and then dried, such that the amount of colloidal silica was 14 g/m². The amount of organic binder in the retaining material was 0.8 mass %, based on the total mass of the retaining material.

Example 4

The first liquid containing inorganic colloid particles and organic binder was prepared by adding 36 g of colloidal alumina (alumina sol, product of Nissan Chemical Industries, Ltd.) and 0.7 g of Nippol LX874 to 500 mL of water and stirring for 5 minute. A retaining material was produced similar to working example 2, except that this first liquid was used. The amount of organic binder in the retaining material was 0.8 mass %, based on the total mass of the retaining material.

Comparative Example 1

A first liquid was prepared by adding 0.7 g of Nippol LX874 to 500 mL of water and stirring for 5 minutes. A needle punched alumina fiber blanket was cut to 14 cm×49 cm, the first liquid was applied by spray coating, and then suctioning and dewatering was performed for 5 seconds on a metal mesh. A retaining material was prepared by impregnating the first liquid into the blanket in this manner, and drying for 30 minutes using a forced air dryer with the temperature set to 170° C. The amount of organic binder in the retaining material was 0.4 mass % based on the total mass of the retaining material.

Comparative Example 2

A retaining material was produced by performing the same process as the <surface coating step> of example 1 on the retaining material of comparative example 1. The amount of organic binder in the retaining material was 0.8 mass % based on the total mass of the retaining material.

Comparative Example 3

A retaining material was produced by performing only the <impregnating step> of example 1. The amount of organic binder in the retaining material was 0.4 mass %, based on the total mass of the retaining material.

Comparative Example 4

The first liquid containing inorganic colloid particles and organic binder was prepared by adding 95 g of colloidal silica (Snowtex OS, product of Nissan Chemical Industries, Ltd.) and 0.7 g of Nippol LX874 to 430 mL of water and stirring for 5 minutes. A retaining material was produced similar to example 1, except that this first liquid was used. The amount of organic binder in the retaining material was 0.7 mass % based on the total mass of the retaining material.

Measuring the Amount of Organic Binder in the Entire Retaining Material

A 25 mm×25 mm sample cut from each of the retaining materials was dried for 1 hour in an oven at 110° C., and then the mass (W0) of the sample containing the organic binder was measured. Next, the sample was heated for 1 hour in a furnace at 900° C., and the mass (W1) after combustion of the organic binder was measured. The weight loss from heating (LOIt) that corresponds to the content of the organic binder in the entire retaining material was calculated using the following equation.

$$\text{Loss from heating (LOI}t)(\text{mass \%}) = (W0 - W1)/W0 \times 100$$

Measuring the Amount of Organic Binder and Inorganic Colloid Particles in the Internal Region and the Surface Layer First, 50 mm×50 mm samples were cut from the inorganic fiber sheets before impregnating, and the weight was measured (Wm0). Next, inorganic fiber sheets impregnated with solutions containing the organic binder and the inorganic colloid particles under the conditions of each of the examples and comparative examples were dried in an oven at 110° C. for 1 hour, and then the weights of the inorganic fiber sheets were measured (Wm1). Next, the samples were heated for 1 hour in a furnace at 900° C., and the masses (Wm2) after combustion of the organic binder were measured.

Next, new 50 mm×50 mm samples were cut from the inorganic fiber sheets that had passed through the impregnating step (after impregnating and drying) under the conditions of each of the examples and comparative examples, and then the weights were measured (Wm3). Next, a solution containing the organic binder and the inorganic colloid particles was sprayed onto one side surface under the conditions of each of the examples and comparative examples, drying was performed in an oven at 110° C. for 1 hour, and then the weights were measured (Wm4). Next, the samples were heated for 1 hour in a furnace at 900° C., and the masses (Wm5) after combustion of the organic binder were measured.

The weight loss from heating (LOIm) that corresponds to the content of the organic binder in the internal region was calculated using the following equation.

$$\text{Loss from heating (LOI}m)(\text{mass \%}) = (Wm1 - Wm2)/Wm4 \times Wm3/Wm1 \times 100$$

$$\text{Amount of inorganic colloid particles (IC}m) = (\text{mass \%}) = (Wm2 - Wm0)/Wm4 \times Wm3/Wm1 \times 100$$

The weight loss from heating (LOIs) that corresponds to the content of the organic binder in the surface layer was calculated using the following equation.

$$\text{Loss from heating (LOI}s)(\text{mass \%}) = (Wm4 - Wm5)/Wm4 \times 100 - LOIm$$

$$\text{Amount of inorganic colloid particles (IC}s)(\text{mass \%}) = (Wm5 - Wm3)/Wm4 \times 100 + LOIm$$

The amount of inorganic colloid particles per unit area can be calculated from the weight per unit area of the inorganic fiber sheet and the sample size.

Measuring Surface Pressure of the Retaining Material at Ambient Temperature (1) A round test piece (diameter: 45 mm) was fabricated using a cutout die from the retaining material (size: 250 mm×250 mm) produced in a manner similar to example 1, and the mass thereof was measured.

(2) The mat thickness where the packing density would be 0.25 g/cm$^3$ was calculated from the measurement value of the mass.

(3) The test piece was placed in the center of a compression plate of a compression tester (model "Autograph AG-I", produced by Shimadzu Corporation), and was compressed at a rate of 20 mm/minute to the predetermined mat thickness determined by the above calculation. The pressure at the peak was used as the surface pressure (kPa).

Measuring the Static Coefficient of Friction of the Retaining Material Before Firing The static coefficient of friction between a stainless steel (SS) plate and the retaining material was measured by the following procedures using an Autograph AGS 100D (registered trademark, Shimadzu Corporation).

Figure 6:
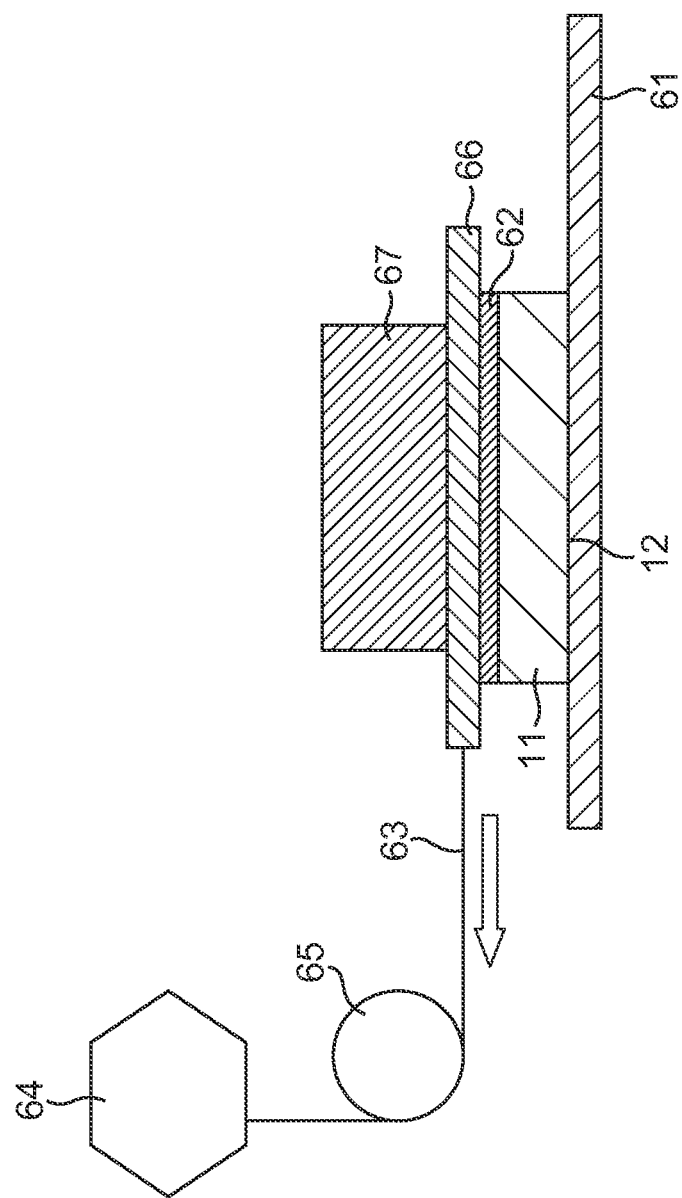
FIG. 6 is a cross-sectional view schematically illustrating a device for measuring the static coefficient of friction of the retaining material.

Each retaining material was cut to form a 50 mm square and thereby fabricate a sample piece. As illustrated in FIG. 6, a sample piece 11 was secured by adhering the surface of the sample piece 11 on the opposite side of the surface 12 where the static coefficient of friction was to be measured, onto a stainless steel (SS) plate 66 using double-sided adhesive tape.

One end of an SS cord 63 with a length of approximately 1 m was attached to the SS plate 66, and the other end was attached to a load cell 64 via a pulley block 65. At this time, the pulley block 65 was placed directly below the load cell 64, and when the load cell 64 was lifted, the SS plate 66 that was attached to the sample piece 11 moved parallel to the ground.

Next, the sample piece 11 was placed on an SS plate 61 at a position such that the SS cord 63 was perpendicular to the center axis of the pulley block 65, and parallel to the ground. The SS plate 61 was 2B treated (cold rolling process) on the plate surface in order to enable use in place of the casing, and the surface was mechanically machined to achieve a surface roughness Ra of 0.2 to 0.5 μm. Furthermore, the height of the load cell 64 was adjusted such that the sample piece 11 was positioned at a maximum distance from the pulley block 65.

A 12 kg load 67 was placed on the SS plate 66. Next, the load cell 64 was raised, and the SS cord 63 was pulled at a tensile speed of 100 mm/minute in the direction of the arrow. The load that was measured immediately before the sample piece 11 began to slide from the surface of the SS plate 61 was recorded as the static friction force (N). The static coefficient of friction was calculated by dividing the static friction force by the load (N) applied to the sample piece 11 including the SS plate 66.

Measuring the Static Coefficient of Friction of the Retaining Material after Firing A 50 mm square was cut from each retaining material to produce sample pieces. The sample piece was fired for 1 hour in an electric furnace set to 600° C. Next, the static coefficient of friction was measured by the method described in <measuring the static coefficient of friction of the retaining material before firing> except that a sample piece that had been cooled to ambient temperature was used.

Measuring the Carrier Pullout Force

Each retaining material was cut to a piece 75 mm wide and 350 mm long, and then wrapped around the outer circumference of a catalyst carrier with a round cylindrical shape having a length of 115 mm and an outer diameter of 105 mm (registered trademark "HONEYCERAM", produced by NGK Ltd.). The samples were press fit at a rate of 40 mm/second into a cylindrical shaped stainless steel casing with a length of 150 mm and an inner diameter of 114 mm using a guide cone. Twenty-four hours after press fitting, the catalyst carrier was pulled from the stainless steel casing at a rate of 40 mm/second, and the carrier pullout force per unit area (N/cm$^2$) of the retaining material was calculated from the maximum load (N) at this time. Note that comparative example 4 provided a hard retaining material and wrapping around the catalyst carrier was difficult because the amount of inorganic colloid particles in the internal region was high, and therefore the carrier pullout force could not be measured for this retaining material.

The results are shown in Table 1.

TABLE 1

| | Name of inorganic colloid used in internal region | Name of inorganic colloid used in surface layer | Amount of inorganic colloid particles in internal region (mass %) | Amount of inorganic colloid particles in surface layer (3 g/m$^2$, for 1 surface) | Amount of organic binder (mass %) | Surface pressure (kPa, at pack density of 0.25 g/cm$^3$) | Static coefficient of friction (ambient temperature) | Static coefficient of friction (600° C. after firing for 1 hour) | Carrier pullout force (N/cm$^2$) | Carrier wrapping properties |
|---|---|---|---|---|---|---|---|---|---|---|
| Example 1 | ST-OS | ST-OS | 3 | 3.5 | 0.7 | 112 | 0.35 | 0.42 | 2.49 | Favorable |
| Example 2 | ST-OS | ST-OS | 3 | 7 | 0.8 | 113 | 0.36 | 0.42 | 2.68 | Favorable |
| Example 3 | ST-OS | ST-OS | 3 | 14 | 0.8 | 111 | 0.35 | 0.36 | 2.36 | Favorable |
| Example 4 | AS100 | ST-OS | 3 | 7 | 0.6 | 115 | 0.34 | 0.38 | 2.30 | Favorable |
| Comparative Example 1 | — | — | 0 | 0 | 0.4 | 88 | 0.27 | 0.26 | 1.88 | Favorable |
| Comparative Example 2 | — | ST-OS | 0 | 3.5 | 0.8 | 87 | 0.35 | 0.42 | 2.16 | Favorable |
| Comparative Example 3 | ST-OS | — | 3 | 0 | 0.4 | 111 | 0.26 | 0.34 | 1.84 | Favorable |
| Comparative Example 4 | ST-OS | ST-OS | 11 | 3.5 | 0.7 | 106 | 0.34 | 0.41 | — | Difficult |

Measuring the Surface Pressure of the Retaining Material after Firing (1) A round test piece (diameter: 45 mm) was fabricated using a cutout die from the retaining material produced in a manner similar to example 1, and the mass was measured.

(2) The mat thickness where the packing density would be 0.25 g/cm$^3$ (excluding the components lost to firing such as the organic components and the like) was calculated from the measurement value of the mass.

(3) The test piece was sandwiched between two plates (made of stainless steel) of a compression tester (model "Autograph AG-I", produced by Shimadzu Corporation), and compressed at a rate of 20 mm/minute to the predetermined mat thickness determined by the above calculation.

Figure 7:
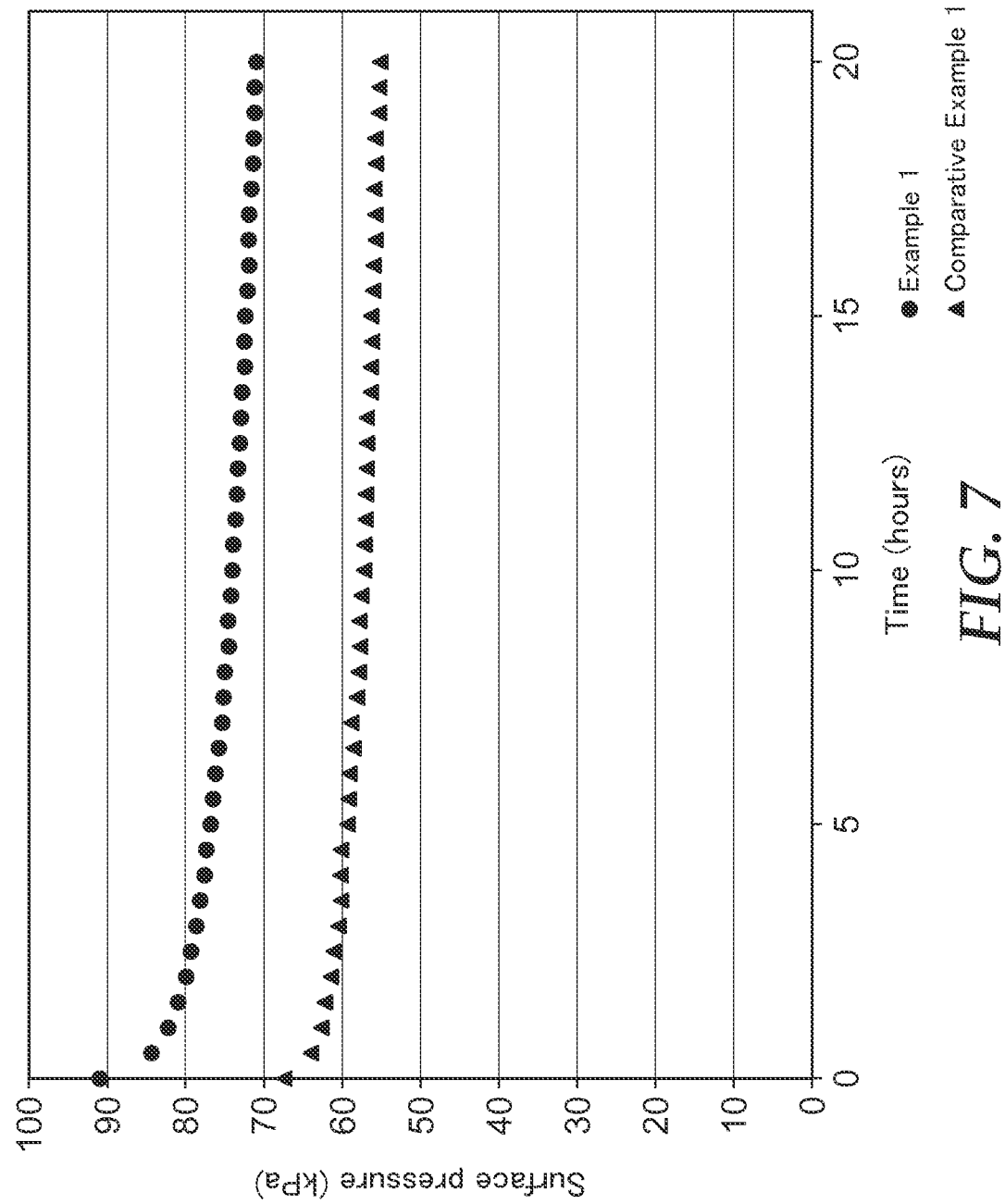
FIG. 7 is a graph showing the change in surface pressure after baking of the retaining material of example 1 and comparative example 1.

(4) One of the two plates was heated to 900° C., and the other was heated to 650° C., in a condition where the test piece was compressed. In order to observe the change in the surface pressure over time, the surface pressure was measured every 30 minutes for 20 hours from the moment (test start time) that the two plates reached 900° C. and 650° C. respectively. The results are shown in Table 2 and FIG. 7. Note that the change in the surface pressure can be simulated by the following equation, and the surface pressure after 10 years was calculated from this approximation formula.

$$Y=aX^b$$

In the formula, X represents time (hours); Y represents surface pressure (kPa); and a and b are coefficients.

A test piece was fabricated from the retaining material produced in a manner similar to comparative example 1, and the surface pressure was measured as described above, except that this test piece was used for measuring. The results are shown in Table 2 and FIG. 7.

TABLE 2

| | Test Retaining Material | Example 1 | Comparative Example 1 |
|---|---|---|---|
| Surface Pressure (kPa) | Test start time | 90.9 | 67.4 |
| | 20 hours after test start time | 70.9 | 55.1 |
| | 10 years later (calculated from approximation equation) | 42.6 | 34.7 |

What is claimed is:

1. A retaining material suitable for mounting a pollution control element in a pollution control device comprising:
    a sheet comprising inorganic fiber material with inorganic colloid particles essentially uniformly dispersed in the thickness direction of the sheet and organic binder essentially uniformly dispersed in the thickness direction of the sheet; and
    a surface layer comprising a coating containing inorganic colloid particles, the inorganic colloid particles adhered so as to coat a surface of the sheet,
    wherein the amount of inorganic colloid particles in the sheet is 1 mass % to 10 mass % based on the total mass of the retaining material, and the surface layer contains a higher concentration of inorganic colloid particles than the sheet.

2. The retaining material according to claim 1, wherein the surface layer is adhered so as to coat opposite surfaces of the sheet.

3. The retaining material according to claim 1, wherein the amount of inorganic colloid particles per unit area of the surface layer is 1 g/m$^2$ to 20 g/m$^2$.

4. The retaining material according to claim 1, wherein the amount of organic binder is 3 mass % or less based on the total mass of retaining material.

5. The retaining material according to claim 1, wherein the sheet is a needle punched molded material.

6. The retaining material according to claim 1, wherein the organic binder is an acrylic latex.

7. The retaining material according claim 1, wherein the inorganic colloid particles have an average particle diameter of 1 µm or less.

8. A pollution control device, comprising:
    a casing;
    a pollution control element provided in the casing; and
    a retaining material according to claim 1, provided between the casing and the pollution control element.

9. The pollution control device according to claim 8, wherein the pollution control element is a catalyst carrier or a filter element.

10. The retaining material according to claim 1, wherein the surface layer is uniformly adhered so as to coat a surface of the sheet.

11. The retaining material according to claim 3, wherein the amount of organic binder is 3 mass % or less based on the total mass of retaining material.

12. The retaining material according to claim 11, wherein the inorganic colloid particles have an average particle diameter of 1 µm or less.

13. The retaining material according to claim 1, wherein the amount of inorganic colloid particles per unit area of the surface layer is 2 g/m$^2$ to 18 g/m$^2$.

14. The retaining material according to claim 1, wherein the amount of inorganic colloid particles per unit area of the surface layer is 3 g/m$^2$ to 15 g/m$^2$.

* * * * *

UNITED STATES PATENT AND TRADEMARK OFFICE
CERTIFICATE OF CORRECTION

PATENT NO. : 10,533,476 B2
APPLICATION NO. : 15/311687
DATED : January 14, 2020
INVENTOR(S) : Kenji Sako Page 1 of 1

It is certified that error appears in the above-identified patent and that said Letters Patent is hereby corrected as shown below:

In the Specification

Column 2, Line 66, delete "Ahe" and insert -- The --, therefor.

Column 14, Lines 54-55, delete "(ICm)=(mass %)" and insert -- (ICm)(mass %) --, therefor.

In the Claims

Column 18, Line 23, Claim 7, after "according" insert -- to --.

Signed and Sealed this
Twenty-first Day of April, 2020

Andrei Iancu
*Director of the United States Patent and Trademark Office*